(12) United States Patent
Chevret et al.

(10) Patent No.: US 11,554,673 B2
(45) Date of Patent: Jan. 17, 2023

(54) METHOD FOR INDUCTIVE ENERGY TRANSMISSION AND DEVICE FOR OPERATING AN INDUCTIVE ENERGY TRANSMISSION DEVICE

(71) Applicant: Robert Bosch GmbH, Stuttgart (DE)

(72) Inventors: Anthony Chevret, Bage la Ville (FR); Ulrich Brenner, Moeglingen (DE)

(73) Assignee: Robert Bosch GmbH, Stuttgart (DE)

( * ) Notice: Subject to any disclaimer, the term of this patent is extended or adjusted under 35 U.S.C. 154(b) by 49 days.

(21) Appl. No.: 15/759,318

(22) PCT Filed: Jul. 12, 2016

(86) PCT No.: PCT/EP2016/066500
§ 371 (c)(1),
(2) Date: Mar. 12, 2018

(87) PCT Pub. No.: WO2017/041932
PCT Pub. Date: Mar. 16, 2017

(65) Prior Publication Data
US 2018/0194239 A1   Jul. 12, 2018

(30) Foreign Application Priority Data
Sep. 10, 2015  (DE) ............. 10 2015 217 274.0

(51) Int. Cl.
*H02J 50/90* (2016.01)
*B60L 5/00* (2006.01)
(Continued)

(52) U.S. Cl.
CPC ............. *B60L 5/005* (2013.01); *B60L 5/38* (2013.01); *B60L 5/42* (2013.01); *B60L 53/124* (2019.02);
(Continued)

(58) Field of Classification Search
None
See application file for complete search history.

(56) References Cited

U.S. PATENT DOCUMENTS 5,595,271 A * 1/1997 Tseng ............... B60L 53/126
191/4
9,073,443 B2 * 7/2015 Baier ................. B60L 53/36
(Continued)

FOREIGN PATENT DOCUMENTS

DE   102011010049   11/2011
DE   102010054909   6/2012
(Continued)

OTHER PUBLICATIONS

International Search Report for Application No. PCT/EP2016/066500 dated Oct. 27, 2016 (English Translation, 2 pages).

*Primary Examiner* — Daniel Kessie
(74) *Attorney, Agent, or Firm* — Michael Best & Friedrich LLP

(57) ABSTRACT

The invention relates to a method for inductive energy transmission from a transmitting coil to a receiving coil spaced apart from the transmitting coil. The receiving coil is arranged in a vehicle which is arranged stationary or is travelling on a supporting surface, wherein the vehicle has at least one sensor. In a first method step (A) a distance between the transmitting coil and/or the supporting surface and the receiving coil is determined, in a second method step (B) a minimum possible air gap between the transmitting coil and/or the supporting surface and the receiving coil is calculated from the distance, and in a third method step (C) the receiving coil is positioned such that the distance corresponds to the minimum possible air gap.

17 Claims, 3 Drawing Sheets

(51) Int. Cl.
*B60L 5/38* (2006.01)
*B60L 5/42* (2006.01)
*B60L 53/39* (2019.01)
*B60L 53/124* (2019.01)
*H02J 50/10* (2016.01)

(52) U.S. Cl.
CPC ............ B60L 53/39 (2019.02); H02J 50/10 (2016.02); H02J 50/90 (2016.02); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | | |
|---|---|---|---|---|
| 2012/0025761 | A1* | 2/2012 | Takada | H02J 50/12 320/108 |
| 2015/0042271 | A1* | 2/2015 | Nakagawa | H02J 7/0027 320/108 |
| 2015/0360577 | A1* | 12/2015 | Greenwood | H02J 7/0048 320/108 |
| 2016/0046197 | A1* | 2/2016 | Kim | B60L 53/34 320/137 |
| 2016/0114687 | A1* | 4/2016 | Ichikawa | H02J 7/025 701/22 |
| 2016/0257209 | A1* | 9/2016 | Lewis | H02J 50/10 |
| 2017/0080815 | A1* | 3/2017 | Wechsler | B60L 53/305 |
| 2018/0136048 | A1* | 5/2018 | Ozaki | H02J 7/00309 |

FOREIGN PATENT DOCUMENTS

| | | |
|---|---|---|
| DE | 102012217779 | 4/2014 |
| JP | H06217404 A | 8/1994 |
| JP | 2001177915 | 6/2001 |
| JP | 2001177916 A | 6/2001 |
| JP | 2013546293 | 12/2013 |

* cited by examiner

METHOD FOR INDUCTIVE ENERGY TRANSMISSION AND DEVICE FOR OPERATING AN INDUCTIVE ENERGY TRANSMISSION DEVICE

BACKGROUND OF THE INVENTION

The present invention relates to a method for inductive energy transmission from a transmitting coil to a receiving coil which is at a distance from the transmitting coil, and an apparatus for operating an inductive energy transmission apparatus.

Electric vehicles and hybrid vehicles usually have an electrical energy store, for example a traction battery, which supplies the electrical energy for the drive. If this electrical energy store is completely or partially discharged, the electric vehicle has to call at a charging station at which the energy store can be recharged. For this purpose, it has to date been customary, at a charging station of this kind, for the electric vehicle to be connected to the charging station by means of a cable connection. Disadvantageously, this connection usually has to be established manually by a user. In this case, it is also necessary for the charging station and the electric vehicle to have a corresponding connecting system.

Furthermore, cable-free charging systems for electric vehicles are occasionally also known. For inductively charging the electric vehicles, one or more coils (transmitting coils) are installed in or on the ground. Furthermore, one or more coils (receiving coil) are furthermore arranged in the electric vehicle. If an electric vehicle is parked over the transmitting coil, said transmitting coil emits an alternating magnetic field. The alternating magnetic field is received by the receiving coil within the vehicle and converted into electrical energy. A traction battery of the vehicle can then be charged by means of this electrical energy owing to the contact-free energy transmission. For cable-free charging of a battery of an electric vehicle, an air gap is located between the transmitting coil of the charging station and the receiving coil in the vehicle. On account of the required ground clearance of motor vehicles, this air gap has a size of a few centimeters. In this case, air gaps are very widespread if an ideally small air gap is not achieved by measures such as lowering the coil which is fixed to the vehicle, the entire vehicle or raising the stationary coil or a combination of these measures. The degree of efficiency of the inductive energy transmission depends, amongst other things, on the air gap (distance) between the coils which are installed in the ground and/or the coils which are installed in the vehicle floor. The smaller the air gap, the greater the degree of efficiency which can be achieved. Furthermore, the energy store of the electric vehicle can also be used for feedback. A cable connection or else an inductive power transmission can optionally be used for this purpose. Document DE 102011010049 A1 discloses a system of this kind for charging a vehicle battery, in which system the energy is inductively transmitted. One disadvantage of the prior art is that the inductive charging is not performed during driving—that is to say is statically charged. Instead, the vehicle has to be in the parked state.

There is therefore a need for an inductive energy transmission apparatus which allows the vehicle to be reliably charged when it is stationary and/or during driving—as a dynamic charging method.

SUMMARY OF THE INVENTION

The method according to the invention has the advantages that the vehicle can be charged both when it is stationary and also during driving. In addition, the range of the electrically operated vehicle can be extended by this kind of dynamic charging To this end, it is provided according to the invention that the method for inductive energy transmission from a transmitting coil to a receiving coil which is at a distance from the transmitting coil, wherein the receiving coil is arranged in a vehicle which is stationary or driving on the underlying surface, proceeds in three steps. A distance between the transmitting coil and/or the underlying surface and the receiving coil is ascertained in the first method step, a minimum possible air gap between the transmitting coil and/or the underlying surface and the receiving coil is calculated from the distance in a second method step, and the receiving coil is positioned such that the distance corresponds to the minimum possible air gap in a third method step. One advantage of this method is that the air gap can be kept as small as possible during the charging process and therefore the degree of efficiency can be kept as high as possible. A further advantage is that, owing to the controlled air gap, the degree of efficiency during dynamic charging can be improved and therefore the maximum possible power can be transmitted.

The vehicle advantageously has at least one sensor, wherein the distance is ascertained by means of this sensor. These sensors advantageously allow the air gap between the coils to be monitored during driving, as a result of which it is possible to adjust the minimum air gap.

Since a distance radar is installed in modern vehicles, it is advantageous that the sensor used is a radar sensor.

It is further advantageous that the distance is ascertained by means of an actively controlled damping system which is arranged in the vehicle. In this case, conclusions can be drawn about the state of the roadway by means of the damping movements, and the air gap between the transmitting coil and receiving coil can be accordingly be taken into account.

It is advantageous that the receiving coil is positioned by means of control actuators which are arranged in the vehicle. Since the existing distance of the vehicle coils from the ground is always known in the control system, the coil is prevented from touching the ground during driving.

The receiving coil is advantageously lifted into an inoperative position in a further method step D if the control actuator system breaks down. The control actuator system which comprises actuators therefore ensures that, for safety reasons, the coil is also lifted into the inoperative position when the actuators breakdown. Damage both to the vehicle and to the infrastructure is avoided in this way.

The receiving coil is advantageously lifted into an inoperative position by springs. Therefore, an electronics system—which may be inoperable owing to a power cut—is not required in order to lift the coil.

Positioning of the receiving coil is advantageously performed by means of the actively controlled damping system which is arranged in the vehicle. This is advantageous since, here, the vehicle coils can be fixedly installed in the vehicle.

Furthermore, the positioning of the receiving coils is advantageously linked to a driving speed of the vehicle. The existing distance of the vehicle coils from the ground always has to be known in the control system. The coil is prevented from touching the ground during driving owing to the control arrangement. Here, the intervention distance advantageously corresponds to the distance between the field of view of the sensors and the coil. The lowered coil (receiving coil) has to be lifted out of the danger zone while this distance is covered. Therefore, lowering of the coil is advantageously dependent on the driving speed, but also on the response time of the actuators to the lifting operation.

The transmitting coil is advantageously arranged in or on the underlying surface. Arranging the transmitting coil in the underlying surface has the advantage that said transmitting coil cannot be regarded as an obstacle which is situated on the road. However, arranging the transmitting coil on the underlying surface has the advantage that the transmitting coil can be easily reached for repair purposes.

BRIEF DESCRIPTION OF THE DRAWINGS

Further features and advantages of exemplary embodiment of the invention can be found in the following description with reference to the appended drawings.

In the drawings.

For reasons of clarity, the drawings illustrated in the figures are not necessarily depicted true to scale. Identical or identically acting components are generally denoted by the same reference symbols.

DETAILED DESCRIPTION

Figure 1:
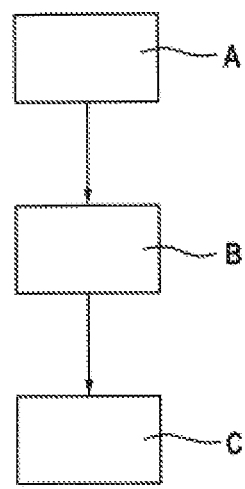
FIG. 1: is a schematic diagram of the different steps in respect of the method for operating an inductive energy transmission apparatus according to an embodiment of the invention.

FIG. 1 is a schematic illustration of a method for operating an inductive energy transmission apparatus 21, as can be used, for example, for charging a traction battery and a vehicle, electric vehicle or hybrid vehicle. The vehicle/electric vehicle 12 is in the stationary or driving state. A distance between the transmitting coil 10 and/or the underlying surface 14 and the receiving coil 11 is ascertained in a first method step A. A minimum possible air gap 16 between the transmitting coil 10 and/or the underlying surface 14 and the receiving coil 11 is calculated from the distance 15 in a second method step B. Furthermore, in step C, the receiving coil 11 is positioned such that the distance 15 corresponds to the minimum possible air gap 16. Owing to this method, inductive charging can also be performed during driving, as a result of which the range of an electrically operated vehicle is considerably extended. The possible minimum air gap 16 between the transmitting coil 10 and the receiving coil 11 is monitored during driving by sensors in the vehicle 12 and adapted by a control actuator system 17 as required. As a result, the air gap 16 is kept as low as possible during the charging process and the degree of efficiency is kept as high as possible or maximized. Contact by the receiving coil with the underlying surface 14 or the roadway 14 is reliably avoided in this way.

Figure 2:
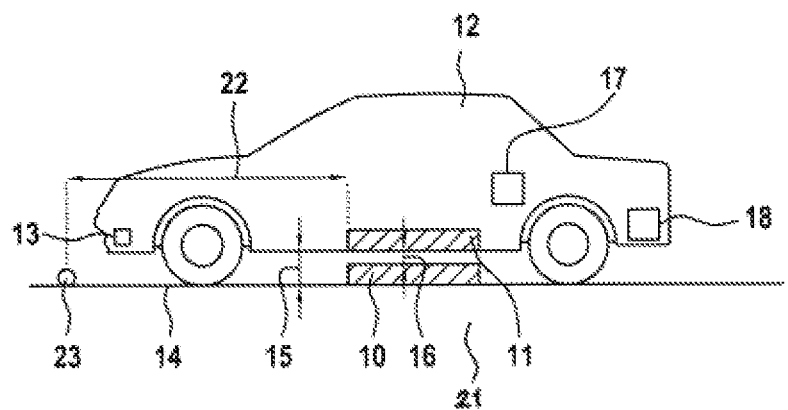
FIG. 2: is a schematic illustration of a cross section through a vehicle comprising an inductive energy transmission apparatus according to an embodiment of the invention.

FIG. 2 is a schematic illustration of a cross section through a vehicle 12 comprising an inductive energy transmission apparatus 21. The inductive energy transmission apparatus 21 is located in a vehicle 12 which is an electric vehicle. The vehicle 12 is stationary or driving on the underlying surface 14 which is a road or a parking space. A receiving coil 11 is arranged in the vehicle 12, said receiving coil preferably being installed in the floor of the vehicle 12. At least one transmitting coil 10 is located below the vehicle 12. Said transmitting coil is installed in the underlying surface 14 or is situated on said underlying surface. The vehicle 12 has a control actuator system 17 and/or an actively controlled damping system 18 by way of which the receiving coil 11 or the vehicle 12 can be lowered or lifted, as a result of which the distance 15 between the transmitting coil 10 and the receiving coil 11 can be adapted. Furthermore, the car 12 has a distance sensor 13. The distance 15 between the transmitting coil 10 and the receiving coil 11 can be ascertained by way of said distance sensor. The distance sensor 13 is preferably a radar sensor. If the vehicle 12 is in the driving state, the position of the receiving coil 11 above the transmitting coils 10 which are located on the underlying surface or in the underlying surface 14 changes continuously. In order to optimize the degree of efficiency during dynamic charging, the distance 15 between transmitting coil 10 and receiving coil 11 is permanently adjusted. Accordingly, during driving in the charging mode, the roadway is monitored such that the lowered transmitting coil 11 is raised in good time when unevennesses 23 or obstacles 23 are encountered, in order to avoid a possible collision between receiving coil 11 and the respective obstacles or unevennesses 23. The distance sensor 13 is used in this respect. If the vehicle 12 has an actively controlled damping system 18 and corresponding distance sensor 13, conclusions can be drawn about the state of the roadway by means of the damping movements, and the air gap 16 between the coils can be accordingly be taken into account and adapted. As a result, the receiving coil 11 is prevented from touching the underlying surface/ground 14 during driving. Here, the intervention distance 22 corresponds to the distance between the field of view of the at least one sensor 13 and the receiving coil 11. The lowered receiving coil 11 has to be lifted out of the danger zone while this distance is covered. Therefore, lowering of the receiving coil 11 is also dependent on the driving speed and the response times (t1) of the control actuator system 17 and/or a response time (t2) of the actively controlled damping system 18.

The control actuator system 17 comprises actuators which lower the receiving coil/vehicle coil 11 in the direction of the roadway 14 during the charging mode. For safety reasons (such as when the actuators break down for example), the receiving coil is lifted into the inoperative position; this is performed, for example, by springs. If the vehicle 12 has an actively controlled chassis (actively controlled damping system) 18, the lowering operation can also be performed by the chassis. In this case, the vehicle coils/receiving coils 11 can also be fixedly installed in the vehicle.

It goes without saying that lowering of the vehicle coil/receiving coil 11 can also be used for increasing the degree of efficiency during charging when the vehicle is stationary. As a result, it is possible to prevent living creatures or metal objects entering the air gap between the coils (transmitting coils and receiving coils) during the charging process. Therefore, identification of foreign objects would not be necessary during charging.

Figure 3:
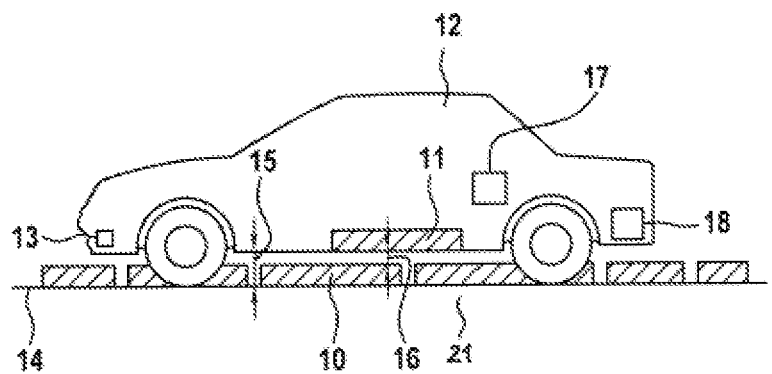
FIG. 3: is a further schematic illustration of a cross section through a vehicle comprising an inductive energy transmission apparatus according to an embodiment of the invention.

FIG. 3 is a schematic illustration of the continuation of the method described in FIG. 2 for operating an inductive energy transmission apparatus 21. Identical elements in respect of FIG. 2 are provided with the same reference symbols and will not be explained in more detail. In this exemplary embodiment, the vehicle 12 is in the driving state. Here, transmitting coils 10 are arranged in the underlying surface/in the roadway 14, the vehicle 12 moving over said transmitting coils during driving. The air gap 16 between the transmitting coil 10 and the at least one receiving coil 11 is permanently monitored during driving by at least one sensor 13 measuring the distance between the transmitting coil 10/the underlying surface 14 and the receiving coil 11 and calculating the minimum possible air gap 16 from said distance. The coil 11 is lowered depending on the driving speed and the response time (t1) of the actuators.

Figure 4:
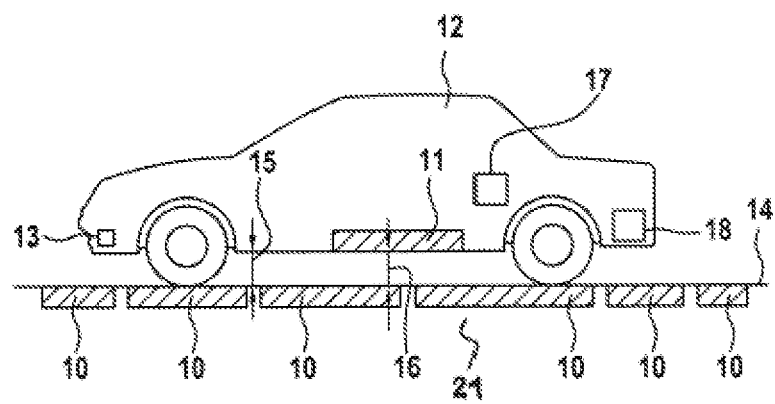
FIG. 4: is a further schematic illustration of a cross section through a vehicle comprising an inductive energy transmission apparatus according to an embodiment of the invention.

FIG. 4 is a further schematic illustration of a cross section through a vehicle comprising an inductive energy transmission apparatus as a continuation of the method described in FIGS. 2 and 3. Identical elements in respect of FIGS. 2 and 3 are provided with the same reference symbols and will not be explained in more detail. In this exemplary embodiment, transmitting coils 10 are arranged on the underlying surface or on the roadway 14.

Figure 5:
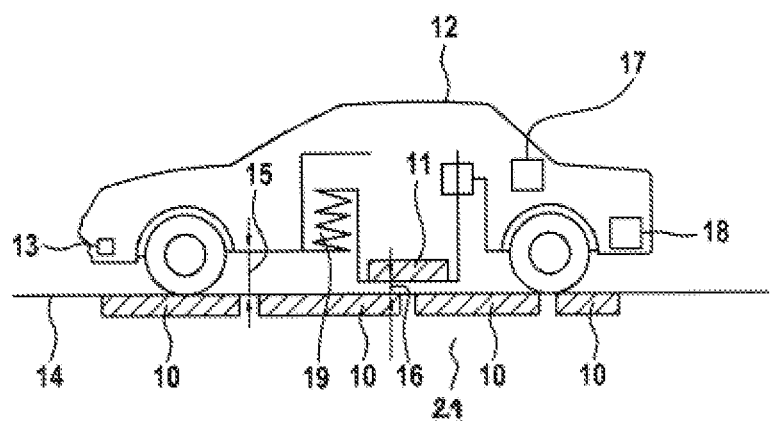
FIG. 5: is a schematic illustration of a cross section through a vehicle comprising an inductive energy transmission apparatus and a control actuator system for lifting or lowering the receiving coil.

FIG. 5 shows, as a further exemplary embodiment of the invention, a cross section through the vehicle 12 comprising an inductive energy transmission apparatus 21 and a control actuator system 17 for lifting or lowering receiving coil 11. The control actuator system 17 has actuators by way of which the receiving coil 11 can be raised or lowered, as a result of which the air gap between transmitting coil 10 and receiving coil 11 is adjusted. In the event of a fault (for example when the control actuator system 17 or the actuators breaks/break down), the receiving coil 11 is lifted into the inoperative position, for example, by springs 19.

What is claimed is:

1. A method for inductive energy transmission from a transmitting coil (10) to a receiving coil (11) which is at a distance from the transmitting coil (10), wherein the receiving coil (11) is arranged in a vehicle (12) which is driving and moving along an underlying surface (14), wherein the receiving coil (11) is fixed to the vehicle, and wherein the transmitting coil (10) is located on or within the underlying surface (14), that the method comprising: ascertaining a measured distance (15) between the transmitting coil (10) and/or the underlying surface (14) and the receiving coil (11) in a first method step (A), calculating, from the measured distance (15), a minimum air gap (16) between the transmitting coil (10) and/or the underlying surface (14) and the receiving coil (11) in a second method step (B), and moving the receiving coil (11) vertically to change a vertical position of the receiving coil (11) while the vehicle is driving and moving along the underlying surface (14), wherein the moving of the receiving coil (11) occurs via an actively controlled damping system (18) in the vehicle (12), wherein the moving of the receiving coil (11) occurs such that a resultant distance between the transmitting coil (10) and/or the underlying surface (14) and the receiving coil (11) corresponds to the minimum air gap (16) in a third method step (C); and charging the vehicle (12) via an inductive energy transmission from the transmitting coil (10) to the receiving coil (11) while the vehicle is driving and moving along the underlying surface (14),
wherein that the moving of the receiving coil (11) is dependent on a driving speed of the vehicle (12) and wherein that the moving of the receiving coil (11) is dependent on a response time (t2) of the actively controlled damping system (18).

2. The method as claimed in claim 1, characterized in that the vehicle has at least one sensor (13), wherein the measured distance (15) is ascertained at least in part by means of the sensor (13).

3. The method as claimed in claim 2, characterized in that the sensor (13) is a radar sensor.

4. The method as claimed in claim 1, characterized in that the measured distance (15) is ascertained at least in part by means of the actively controlled damping system (18) which is arranged in the vehicle (12).

5. The method as claimed in claim 1, characterized in that the transmitting coil (10) is arranged in or on the underlying surface (14).

6. An apparatus for inductive energy transmission as claimed in claim 1.

7. The method as claimed in claim 1, wherein moving the receiving coil includes lowering the receiving coil relative to a vehicle height.

8. The method as claimed in claim 1, characterized in that the vehicle has at least one sensor (13), wherein the method includes using the sensor (13) as the vehicle is driving to detect an unevenness or obstacle (23) on the underlying surface (14), and lifting the receiving coil (11) vertically away from the underlying surface (14) in response to detection of the unevenness or obstacle (23).

9. The method as claimed in claim 8, wherein the method includes lowering the receiving coil (11) after passing the unevenness or obstacle (23), wherein lifting the receiving coil (11) includes increasing the distance between the transmitting coil (10) and/or the underlying surface (14) and the receiving coil (11), and wherein lowering the receiving coil (11) includes decreasing the distance between the transmitting coil (10) and/or the underlying surface (14) and the receiving coil (11), and wherein lowering the receiving coil (11) includes lowering the receiving coil (11) until the resultant distance between the transmitting coil (10) and/or the underlying surface (14) and the receiving coil (11) corresponds to the minimum air gap (16).

10. The method as claimed in claim 8, wherein the at least one sensor (13) includes a sensor located along a front of the vehicle (12) and in front of a front tire of the vehicle (12).

11. The method as claimed in claim 1, wherein the step of moving includes moving the receiving coil (11) linearly.

12. The method as claimed in claim 1, wherein the moving occurs such that the resultant distance between the transmitting coil (10) and the receiving coil (11) corresponds to the minimum air gap (16) in the third method step (C).

13. The method as claimed in claim 8, further comprising determining a state of the roadway via damping movements.

14. The method as claimed in claim 1, further comprising lowering the receiving coil (11) based on a driving speed of the vehicle and a response time (t2) of the actively controlled damping system.

15. The method as claimed in claim 1, wherein the moving of the receiving coil (11) also occurs via a control actuator system (17) in the vehicle (12).

16. A method for inductive energy transmission from a transmitting coil (10) to a receiving coil (11) which is at a distance from the transmitting coil (10), wherein the receiving coil (11) is arranged in a vehicle (12) which is driving on an underlying surface (14), the method comprising:
    ascertaining a measured distance (15) between the transmitting coil (10) and/or the underlying surface (14) and the receiving coil (11) in a first method step (A),
    calculating, from the measured distance (15), a minimum air gap (16) between the transmitting coil (10) and/or the underlying surface (14) and the receiving coil (11) in a second method step (B), and moving the receiving coil (11) vertically to change a vertical position of the receiving coil (11) while the vehicle is driving and moving along the underlying surface (14), wherein the moving of the receiving coil (11) occurs such that a resultant distance between the transmitting coil (10) and/or the underlying surface (14) and the receiving coil (11) corresponds to the minimum air gap (16) in a third method step (C), where the moving of the receiving coil (11) is dependent on both a driving speed of the vehicle (12) and a response time (t1) of a control actuator system (17) in the vehicle (12); and wherein the method further includes charging the vehicle (12) via an inductive energy transmission from the transmitting coil (10) to the receiving coil (11) while the vehicle (12) is driving and moving along the underlying surface (14).

17. A method for inductive energy transmission from a transmitting coil (10) to a receiving coil (11) which is at a distance from the transmitting coil (10), wherein the receiving coil (11) is arranged in a vehicle (12) which is driving on an underlying surface (14), the method comprising: ascertaining a measured distance (15) between the transmitting coil (10) and/or the underlying surface (14) and the receiving coil (11) in a first method step (A), calculating, from the measured distance (15), a minimum air gap (16) between the transmitting coil (10) and/or the underlying surface (14) and the receiving coil (11) in a second method step (B), and moving the receiving coil (11) vertically to change a vertical position of the receiving coil (11) while the vehicle is driving and moving along the underlying surface (14), wherein the moving of the receiving coil (11) occurs such that a resultant distance between the transmitting coil (10) and/or the underlying surface (14) and the receiving coil (11) corresponds to the minimum air gap (16) in a third method step (C), where the moving of the receiving coil (11) is dependent on a response time (t2) of an actively controlled damping system (18) in the vehicle (12); and wherein the method further includes charging the vehicle (12) via an inductive energy transmission from the transmitting coil (10) to the receiving coil (11) while the vehicle (12) is driving and moving along the underlying surface (14), wherein that the moving of the receiving coil (11) is dependent on a driving speed of the vehicle (12) and wherein that the moving of the receiving coil (11) is dependent on a response time (t2) of the actively controlled damping system (18).

\* \* \* \* \*